Patented Aug. 14, 1934

1,969,801

UNITED STATES PATENT OFFICE 1,969,801

HYDROCARBON SUBSTITUTED BROMOPHENOL

Emil Klarmann, Jersey City, N. J., assignor to Lehn & Fink, Inc., Bloomfield, N. J., a corporation of Delaware

No Drawing. Application July 22, 1933, Serial No. 681,759

7 Claims. (Cl. 260—154)

The present invention relates to substituted mono-bromophenols and more particularly to such compounds having a high germicidal effectiveness, for example, to bacteria of the type represented by *Staphylococcus aureus* as well as to other bacteria generally.

It has been found that mono-bromophenols substituted by alkyl hydrocarbon radicals in which the number of carbon atoms in the substituting radical or radicals is at least 5 are highly effective germicidal agents. One or more hydrocarbon radicals of the class hereinbefore set forth may be substituted in the bromophenol, the hydrocarbon radical or radicals taking various positions in the molecule.

Compounds in accordance with the present invention may be produced by various procedures. For example, direct bromination of phenols substituted with the desired hydrocarbon radical or radicals may be employed. It has likewise been found possible to produce such compounds by condensation of alkyl derivatives such as alcohols or halides with a mono-bromophenol or a substituted mono-bromophenol. Another method which has been found suitable is to esterify a mono-bromophenol or substituted mono-bromophenol with a suitable acylchloride, effect a rearrangement of the resulting ester to form a ketone and reduce the ketone to the corresponding phenol. The following examples illustrate compounds in accordance with the present invention produced by methods of the character set forth.

Example I 41 parts by weight of para-tertiary-amyl phenol is dissolved in about 100 parts of a suitable solvent, such as carbon tetrachloride. The solution is cooled, say to about 0° C. and to it is added slowly a solution of 40.8 parts of bromine in 25 parts of carbon tetrachloride with continuous stirring. The mixture is allowed to stand for some time, say 8 to 12 hours or longer, is then warmed gently and the solvent evaporated and recovered, if desired. The residue is washed with water and suitably with a solution of sodium bicarbonate, and after drying, is distilled in vacuo. The product is 4-tert. amyl-2-bromophenol; distills at 122° C. at 4 mm. Hg absolute pressure; and has a phenol coefficient with respect to *Staph. aureus* of 150.

By employing a similar procedure, using the corresponding molecular combining proportions, other compounds in accordance with the present invention may be made. For example, by using para-n-amyl phenol or para-n-hexyl phenol, in a similar bromination procedure, the corresponding 4-alkyl-2-bromophenols may be prepared and are found to be effective germicidal agents.

By a similar procedure, employing ortho- or meta-substituted phenols, corresponding mono-bromophenols with the substituting alkyl and bromine groups in different relative positions may be secured.

The procedure may also be applied to polyalkyl compounds in which the sum of the carbon atoms in the substituting alkyl groups is at least 5, with the production of compounds falling within the present invention; for example, by such bromination of 4-n-propyl-3,5-dimethyl phenol, there has been produced 4-n-propyl-3,5-dimethyl-2-bromophenol. It has a melting point of 91.3° C. and a phenol coefficient (to *Staph. aureus*) of 257. By similar methods, other polyalkyl mono-bromophenols in accordance with the invention may be prepared; for example, normal butyl- or isobutyl-methyl-mono-bromophenols, butyl-dimethyl-mono-bromophenols, isopropyl-dimethyl-mono-bromophenols, and the like.

As hereinbefore stated, other methods may be employed for preparing compounds in accordance with the present invention. For example, a hexyl-bromophenol may be prepared in the following manner:

About 48 parts by weight of caproyl chloride is added to about 58 parts of para-bromophenol and the mixture allowed to stand for 8 to 12 hours or longer. The resulting p-bromo-phenyl caproate is washed with warm water, dried, and distilled in vacuo. It distills at 139–140° C. at 2 mm. Hg absolute pressure.

By treating the p-bromophenyl caproate with aluminum chloride (suitably about half its weight) at 150–160° C. for about 30 minutes, it is rearranged to form 5-bromo-2-hydroxy-caprophenone. The mixture resulting from the aluminum chloride treatment and containing this compound is treated with cold water and dilute hydrochloric acid. The suspended precipitate is taken up with ether, the ether solution washed with water and after evaporation of the ether, the ketone is re-crystallized, suitably from isopropyl alcohol.

The 5-bromo-2-hydroxycaprophenone is then reduced, suitably with amalgamated zinc and 15% HCl, forming 2-n-hexyl-4-bromophenol. The latter is separated and purified by vacuum distillation and recrystallized suitably from heptane. It melts at 53.6° C. and boils at 150–152° C. at 4 mm. Hg absolute pressure. Its phenol coefficient (to *Staph. aureus*) is 714.

By similar series of reactions, using valeryl chloride, 2-n-amyl-4-bromophenol may be prepared. It melts at 36° C., boils at 143–145° C. at 3 mm. Hg absolute pressure and has a phenol coefficient (to *Staph. aureus*) of 571.

By using acyl chlorides having a greater number of carbon atoms, substituting alkyl groups with a greater number of carbon atoms may be introduced. Likewise, by employing ortho- or meta-mono-bromophenols in the reaction, compounds may be secured in which the substituting alkyl groups and the bromine are in different relative positions than in the compounds set forth.

It is readily apparent that other compounds within the scope of the invention may be prepared with the substituting hydrocarbon group or groups and the bromine group in different relative positions. Other methods may likewise be employed; for example, direct condensation of alcohols or alkyl chlorides with mono-bromophenols in the presence of suitable condensing agents, such as zinc chloride, sulfuric acid, or the like. For example, by direct condensation of approximately molecular equivalent parts of n-amyl-alcohol and para-bromophenol in the presence of anhydrous zinc chloride and concentrated hydrochloric acid, a mixture of amyl-mono-bromophenols has been prepared, having a boiling point of 134 to 138° C. at 4 mm. Hg absolute pressure and having a high bactericidal effectiveness; phenol coefficient with respect to *Staph. aureus* 150.

With respect to certain matter contained herein, the application is a continuation in part of my prior application Serial No. 656,028, filed February 11, 1933, and of the prior applications of myself and another, Serial No. 630,784, filed August 29, 1932; Serial No. 640,129, filed August 28, 1932 and Serial No. 640,898, filed November 2, 1932.

I claim:

1. A hydrocarbon substituted mono-bromophenol having at least one substituting alkyl radical, the number of carbon atoms in the substituting hydrocarbon radical or radicals being at least 5.

2. An alkyl-substituted mono-bromophenol, the substituting alkyl radical having at least 5 carbon atoms.

3. A polyalkyl substituted mono-bromophenol, the sum of the carbon atoms in the substituting alkyl radicals being at least 5.

4. 4-tertiary amyl-2-bromophenol.

5. Amyl mono-bromophenol.

6. 2-n-hexyl-4-bromophenol.

7. 4-n-propyl-3,5-dimethyl-2-bromophenol.

EMIL KLARMANN.

DISCLAIMER 1,969,801.—*Emil Klarmann*, Jersey City, N. J. HYDROCARBON SUBSTITUTED BROMOPHENOL. Patent dated August 14, 1934. Disclaimer filed April 27, 1938, by the assignee, *Lehn & Fink Products Corporation*.

Hereby enters its disclaimer to claim 4 of said Letters Patent.

[*Official Gazette May 24, 1938.*]

DISCLAIMER 1,969,801.—*Emil Klarmann*, JERSEY CITY, N. J. HYDROCARBON SUBSTITUTED BROMOPHENOL. Patent dated August 14, 1934. Disclaimer filed February 3, 1940, by the assignee, *Lehn & Fink Products Corporation*.

Hereby enters this disclaimer to claims 1, 2, 3, and 5 of said Letters Patent.

[*Official Gazette February 27, 1940.*]

By similar series of reactions, using valeryl chloride, 2-n-amyl-4-bromophenol may be prepared. It melts at 36° C., boils at 143-145° C. at 3 mm. Hg absolute pressure and has a phenol coefficient (to *Staph. aureus*) of 571.

By using acyl chlorides having a greater number of carbon atoms, substituting alkyl groups with a greater number of carbon atoms may be introduced. Likewise, by employing ortho- or meta-mono-bromophenols in the reaction, compounds may be secured in which the substituting alkyl groups and the bromine are in different relative positions than in the compounds set forth.

It is readily apparent that other compounds within the scope of the invention may be prepared with the substituting hydrocarbon group or groups and the bromine group in different relative positions. Other methods may likewise be employed; for example, direct condensation of alcohols or alkyl chlorides with mono-bromophenols in the presence of suitable condensing agents, such as zinc chloride, sulfuric acid, or the like. For example, by direct condensation of approximately molecular equivalent parts of n-amyl-alcohol and para-bromophenol in the presence of anhydrous zinc chloride and concentrated hydrochloric acid, a mixture of amyl-mono-bromophenols has been prepared, having a boiling point of 134 to 138° C. at 4 mm. Hg absolute pressure and having a high bactericidal effectiveness; phenol coefficient with respect to *Staph. aureus* 150.

With respect to certain matter contained herein, the application is a continuation in part of my prior application Serial No. 656,028, filed February 11, 1933, and of the prior applications of myself and another, Serial No. 630,784, filed August 29, 1932; Serial No. 640,129, filed August 28, 1932 and Serial No. 640,898, filed November 2, 1932.

I claim:
1. A hydrocarbon substituted mono-bromophenol having at least one substituting alkyl radical, the number of carbon atoms in the substituting hydrocarbon radical or radicals being at least 5.
2. An alkyl-substituted mono-bromophenol, the substituting alkyl radical having at least 5 carbon atoms.
3. A polyalkyl substituted mono-bromophenol, the sum of the carbon atoms in the substituting alkyl radicals being at least 5.
4. 4-tertiary amyl-2-bromophenol.
5. Amyl mono-bromophenol.
6. 2-n-hexyl-4-bromophenol.
7. 4-n-propyl-3,5-dimethyl-2-bromophenol.

EMIL KLARMANN.

DISCLAIMER 1,969,801.—*Emil Klarmann*, Jersey City, N. J. HYDROCARBON SUBSTITUTED BROMOPHENOL. Patent dated August 14, 1934. Disclaimer filed April 27, 1938, by the assignee, *Lehn & Fink Products Corporation*.

Hereby enters its disclaimer to claim 4 of said Letters Patent.

[*Official Gazette May 24, 1938.*]

DISCLAIMER 1,969,801.—*Emil Klarmann*, JERSEY CITY, N. J. HYDROCARBON SUBSTITUTED BROMOPHENOL. Patent dated August 14, 1934. Disclaimer filed February 3, 1940, by the assignee, *Lehn & Fink Products Corporation*.

Hereby enters this disclaimer to claims 1, 2, 3, and 5 of said Letters Patent.

[*Official Gazette February 27, 1940.*]